(12) United States Patent
Xiao et al.

(10) Patent No.: US 11,803,071 B2
(45) Date of Patent: Oct. 31, 2023

(54) DISPLAY PANEL

(71) Applicant: Shenzhen China Star Optoelectronics Semiconductor Display Technology Co., Ltd., Guangdong (CN)

(72) Inventors: Bangqing Xiao, Guangdong (CN); Yi Li, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 536 days.

(21) Appl. No.: 17/055,614

(22) PCT Filed: Oct. 23, 2020

(86) PCT No.: PCT/CN2020/123282
§ 371 (c)(1),
(2) Date: Nov. 16, 2020

(87) PCT Pub. No.: WO2022/047931
PCT Pub. Date: Mar. 10, 2022

(65) Prior Publication Data
US 2022/0308373 A1    Sep. 29, 2022

(30) Foreign Application Priority Data
Sep. 1, 2020   (CN) .......................... 202010904535.7

(51) Int. Cl.
*G01R 31/26* (2020.01)
*G02F 1/13* (2006.01)
(Continued)

(52) U.S. Cl.
CPC .......... *G02F 1/1309* (2013.01); *G02F 1/1339* (2013.01); *G02F 1/1345* (2013.01)

(58) Field of Classification Search
CPC ............ G01R 31/2822; G01R 31/2825; G01R 31/2884; G01R 31/2886; G01R 31/2889; G01R 31/3025; G01R 31/31723; G01R 31/3641; G01R 29/0814; G01R 29/0878; G01R 29/26; G02F 1/1309; G02F 1/1339;
(Continued)

(56) References Cited

U.S. PATENT DOCUMENTS

2003/0151714 A1   8/2003   Takahashi et al.
2005/0023956 A1*  2/2005   Kwak ................. H10K 59/131
                                                       313/497
(Continued)

FOREIGN PATENT DOCUMENTS

CN   101681068      3/2010
CN   101855663      10/2010
(Continued)

*Primary Examiner* — Thang X Le (57) ABSTRACT

The present application provides a display panel. The display panel includes a display region and a bonding test region. The display panel includes a base substrate which is provided with a plurality of first test terminals. The bonding test region includes a sealant-blanked sub region and sealant-coated sub regions. Each of the first test terminals is located in the sealant-coated sub region, and the base substrate and each of the first test terminals are provided with a sealing glue layer covering each of the first test terminals.

20 Claims, 5 Drawing Sheets (51) Int. Cl.
*G02F 1/1339* (2006.01)
*G02F 1/1345* (2006.01)

(58) Field of Classification Search
CPC .. G02F 1/1341; G02F 1/1345; G02F 1/13415; G02F 1/13452
See application file for complete search history.

(56) References Cited

U.S. PATENT DOCUMENTS

| | | | |
|---|---|---|---|
| 2007/0040983 A1* | 2/2007 | Ishii | G02F 1/1345 349/152 |
| 2010/0182530 A1 | 7/2010 | Fujikawa | |
| 2010/0253656 A1 | 10/2010 | Fujikawa | |
| 2015/0264805 A1* | 9/2015 | Chen | G02F 1/13394 428/141 |
| 2021/0020863 A1* | 1/2021 | Sonoda | H05B 33/28 |

FOREIGN PATENT DOCUMENTS

| | | |
|---|---|---|
| CN | 108400101 | 8/2018 |
| JP | 2002-124554 | 4/2002 |
| JP | 2002-196356 | 7/2002 |
| JP | 2005-352419 | 12/2005 |

\* cited by examiner

DISPLAY PANEL

RELATED APPLICATIONS

This application is a National Phase of PCT Patent Application No. PCT/CN2020/123282 having International filing date of Oct. 23, 2020, which claims the benefit of priority of Chinese Patent Application No. 202010904535.7 filed on Sep. 1, 2020. The contents of the above applications are all incorporated by reference as if fully set forth herein in their entirety.

FIELD AND BACKGROUND OF THE INVENTION

The present application relates to display technologies, and more particularly to a display panel.

With the development of display technologies, liquid crystal displays (LCDs) have attracted more and more attention. In manufacturing display panels, in order to carry out tests on the products after cell operation is finished, to find problems in advance and avoid a waste of subsequent materials, it usually makes a thin-film transistor (TFT) substrate longer than a color filter (CF) substrate so as to form an outer lead bonding (OLB) region to expose test terminals (pads) of the product. The test terminals are used for detection with a use of pins, and are sealed with sealant such as tuffy after the detection is completed, to prevent invasion of water and moisture.

Currently, for large-scaled display panel products, in order to decrease production time and increase production efficiency, the adopted sealant coating method is usually a two-part coating method, that is, the coating is performed from two ends to a middle of the bonding test region. In order to prevent glue coating areas of the two ends from overlapping at the middle, causing the height of the sealing glue to exceed the height of a polarizer on a color filter (CF) substrate to affect the function of the display panel, a spacing is deployed between the glue coating areas of the two ends, and therefore at the middle, there is a blank region of 3-5 mm without any glue coated. However, this will cause test pads located at the middle to be exposed. It would be easy to introduce static electricity into the display panel, causing electrostatic breakdown and lowering the display panel performance.

SUMMARY OF THE INVENTION

The present application provides a display panel, for solving the technical problems of existing large-scaled display panels, in which test pads exposes at the middle of the bonding test region, and it is thus easy to introduce static electricity into the display panel, causing electrostatic breakdown and lowering the display panel performance.

To solve above problems, the technical solutions provide in the present application are described below.

The present application provides a display panel, including a display region and a bonding test region located at a side of the display region, the display panel including a base substrate which is provided with a plurality of first test terminals located in the bonding test region;

wherein the bonding test region includes a sealant-blanked sub region located at a middle part of the bonding test region and sealant-coated sub regions located at two sides of the sealant-blanked sub region, wherein each of the first test terminals is located in the sealant-coated sub region, and the base substrate and each of the first test terminals are provided with a sealing glue layer covering each of the first test terminals.

In the display panel provided in the present application, the display panel further includes at least a second test terminal located in the sealant-blanked sub region, wherein the base substrate includes a base and a flattening insulation layer located above the base, each of the first test terminals is located on the flattening insulation layer, and the second test terminal is located between the flattening insulation layer and the base.

In the display panel provided in the present application, a signal connecting line is disposed between the second test terminal and at least one of the first test terminals, and the signal connecting line is located between the flattening insulation layer and the base.

In the display panel provided in the present application, amongst the first test terminals, two of the first test terminals located at two sides of the second test terminal are connected to the second test terminal via the signal connecting line, and a distance from the two first test terminals to the second test terminal is less than a distance from other ones of the first test terminals to the second test terminal.

In the display panel provided in the present application, the base is provided with a first signal test line connecting to the first test terminal, the base and the first signal test line are provided with a first insulating layer covering the first signal test line, the first insulating layer is provided with a second signal test line connecting to the first test terminal, the first insulating layer and the second signal test line are provided with a second insulating layer covering the second signal test line, the flattening insulation layer is disposed on the second insulating layer, a cross-sectional area of the signal connecting line is greater than a cross-sectional area of the first signal test line, and a cross-sectional area of the signal connecting line is greater than a cross-sectional area of the second signal test line.

In the display panel provided in the present application, the signal connecting line is disposed between the base and the first insulating layer; or the signal connecting line is disposed between the first insulating layer and the second insulating layer.

In the display panel provided in the present application, the second test terminal is disposed between the base and the first insulating layer; or the second test terminal is disposed between the first insulating layer and the second insulating layer.

In the display panel provided in the present application, the signal connecting line includes a first signal connecting line disposed between the base and the first insulating layer and a second signal connecting line disposed between the first insulating layer and the second insulating layer, and the first signal connecting line and the second insulating layer are connected in parallel through a bridging line.

In the display panel provided in the present application, a first via hole is disposed above the first signal connecting line and sequentially penetrates the first insulating layer, the second insulating layer and the flattening insulation layer, a second via hole is disposed above the second signal connecting line and sequentially penetrates the second insulating layer and the flattening insulation layer, the bridging line is disposed between the flattening insulation layer and the sealing glue layer, one end of the bridging line is connected to the first signal connecting line through the first via hole, and the other end of the bridging line is connected to the second signal connecting line through the second via hole.

In the display panel provided in the present application, the first insulating layer is provided with a third via hole, the bridging line is disposed at the third via hole, two ends of the bridging line are connected to the first signal connecting line and the second signal connecting line respectively, and the bridging line is located in the sealant-coated sub regions or the sealant-blanked sub region.

The beneficial effects of the present application are described as follows. In the present application, by dividing the bonding test region into the sealant-blanked sub region and the sealant-coated sub region and deploying in the sealant-coated sub region each of the first test terminals requiring to be sealed by the sealing glue layer, there is no exposed test terminals in the sealant-blanked sub region. This avoids the test terminals being exposed in the sealant-blanked sub region, thereby preventing static electricity from introducing into the display panel and ensuring stability of electric circuits inside the display panel.

BRIEF DESCRIPTION OF THE SEVERAL VIEWS OF THE DRAWINGS

For explaining the technical solutions used in the existing arts or the embodiments more clearly, the appended figures to be used in describing the existing arts or the embodiments will be briefly introduced in the following. Obviously, the appended figures described below are only some of the embodiments of the invention, and those of ordinary skill in the art can further obtain other figures according to these figures without making any inventive effort.

DESCRIPTION OF SPECIFIC EMBODIMENTS OF THE INVENTION

The following descriptions for the respective embodiments are specific embodiments capable of being implemented for illustrations of the present invention with referring to the appended figures. In describing the present invention, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present invention for ease of understanding, but are not intended to limit the present invention. In the appended figures, units with similar structures are indicated by same reference numbers.

In the description of the present application, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicated orientation or positional relationship are based on the relationship of the position or orientation shown in the drawings, which is only for the purpose of facilitating description of the present application and simplifying the description, but is not intended to or implied that the device or element referred to must have a specific orientation, and be constructed and operated in a particular orientation. Therefore, it should not be construed as a limitation of the present application. In addition, the terms "first" and "second" are used for descriptive purposes only, and should not be taken to indicate or imply relative importance, or implicitly indicate the indicated number of technical features. Thus, by defining a feature with "first" or "second", it may explicitly or implicitly include one or more features. In the description of the present application, "a plurality" means two or more unless explicitly defined.

In the description of the present application, it should be noted that unless otherwise explicitly specified or limited, the terms "installed", "connected", and "connection" should be construed broadly, for example, a fixed connection, a removable connection, or integrally connected. These terms may be directed to a mechanical connection, and may also be directed to an electrical connection or communication. Moreover, these terms can be directed to "directly attached", "indirectly connected" through an intermediate medium, and may be directed to "internally communicated" with two components or the "interaction relationship" between two components. For persons skilled in the art, they can understand the specific meaning of the terms in the present application based on specific conditions.

In the present application, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

The following disclosure provides a plurality of different embodiments or examples to implement different structures of this application. To simplify the disclosure of this application, the following describes components and settings in particular examples. Certainly, the examples are merely for illustrative purposes, and are not intended to limit this application. In addition, in this application, reference numerals and/or reference letters may be repeated in different examples. This repetition is for the purpose of simplicity and clarity, and does not in itself indicate a relationship between the various embodiments and/or settings that are discussed. In addition, this application provides examples of various particular processes and materials, but a person of ordinary skill in the art will recognize that other processes and/or materials may be applied and/or used.

The technical solutions of the present application will be described with reference to embodiments as follows.

Figure 1:
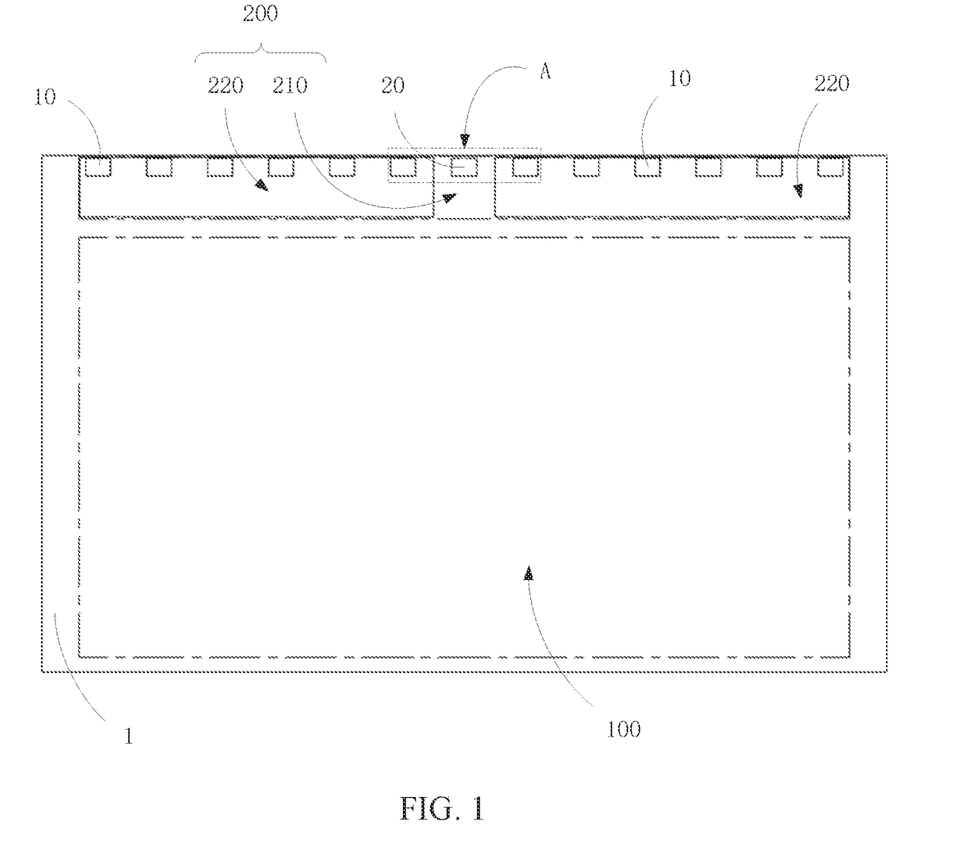
FIG. 1 is a structural schematic diagram illustrating a display panel according to an embodiment of the present application.

The present application provides a display panel. As shown in FIG. 1, the display panel includes a display region 100 and a bonding test region 200 (i.e., an outer lead bonding (OLB) region) located at a side of the display region 100. The display panel includes a base substrate 1 which is provided with a plurality of first test terminals 10 located in the bonding test region 200.

The bonding test region 200 includes a sealant-blanked sub region 210 located at a middle part of the bonding test region 200 and sealant-coated sub regions 220 located at two sides of the sealant-blanked sub region 210. Each of the first test terminals 10 is located in the sealant-coated sub region 220. The base substrate 1 and each of the first test terminals 10 are provided with a sealing glue layer (not shown) covering each of the first test terminals 10.

It can be understood that for large-scaled display panel products, in order to decrease production time and increase production efficiency, the adopted sealant coating method is usually a two-part coating method, that is, the coating is performed from two ends to a middle of the bonding test region. In order to prevent glue coating areas of the two ends from overlapping at the middle, causing the height of the sealing glue to exceed the height of a polarizer on a color filter (CF) substrate to affect the function of the display panel, a spacing is deployed between the glue coating areas of the two ends, and therefore at the middle, there is a blank region of 3-5 mm without any glue coated. However, this will cause test pads located at the middle to be exposed. It would be easy to introduce static electricity into the display panel, causing electrostatic breakdown and lowering the display panel performance. In the present embodiment, by dividing the bonding test region 200 into the sealant-blanked sub region 210 and the sealant-coated sub region 220 and deploying in the sealant-coated sub region 220 each of the first test terminals requiring to be sealed by the sealing glue layer, there is no exposed test terminals in the sealant-blanked sub region 210. This avoids the test terminals being exposed in the sealant-blanked sub region 210, thereby preventing static electricity from introducing into the display panel and ensuring stability of electric circuits inside the display panel.

In an embodiment, as shown in FIGS. 1 to 6, the display panel further includes at least a second test terminal 20 located in the sealant-blanked sub region 210. The base substrate 1 includes a base 11 and a flattening insulation layer 12 located above the base 11. Each of the first test terminals 10 is located on the flattening insulation layer 12. The second test terminal 20 is located between the flattening insulation layer 12 and the base 11. It can be understood that the second test terminal 20 is located between the flattening insulation layer 12 and the base 11, that is, the second test terminal 20 located in the sealant-blanked sub region 210 is disposed in the base substrate 1. The sealing of the second test terminal 20 is achieved by the flattening insulation layer 12 without the need of the sealing glue layer. It prevents water and moisture from invading the second test terminal 20 and also avoids the second test terminal 20 being exposed to introduce static electricity into the display panel, thereby ensuring stability of electric circuits inside the display panel.

Figure 2:
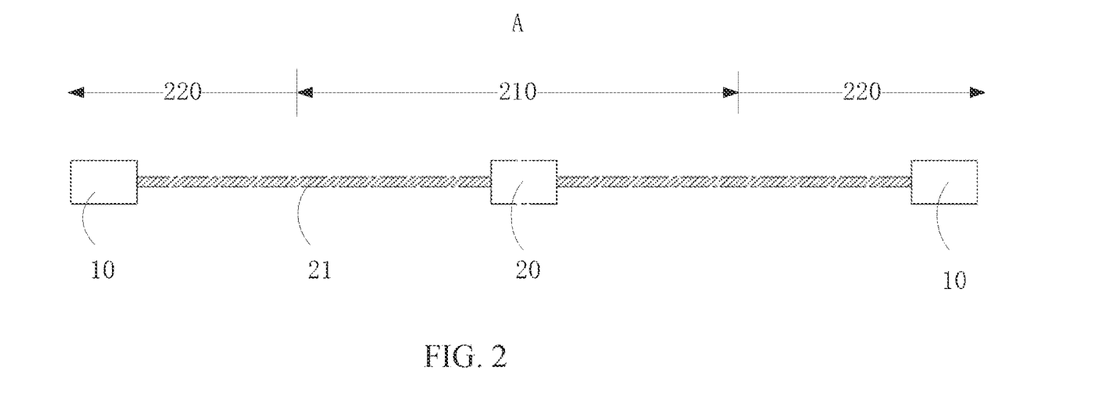
FIG. 2 is a structural schematic diagram illustrating a first type of partially enlarged view at Area A shown in FIG. 1.
Figure 3:
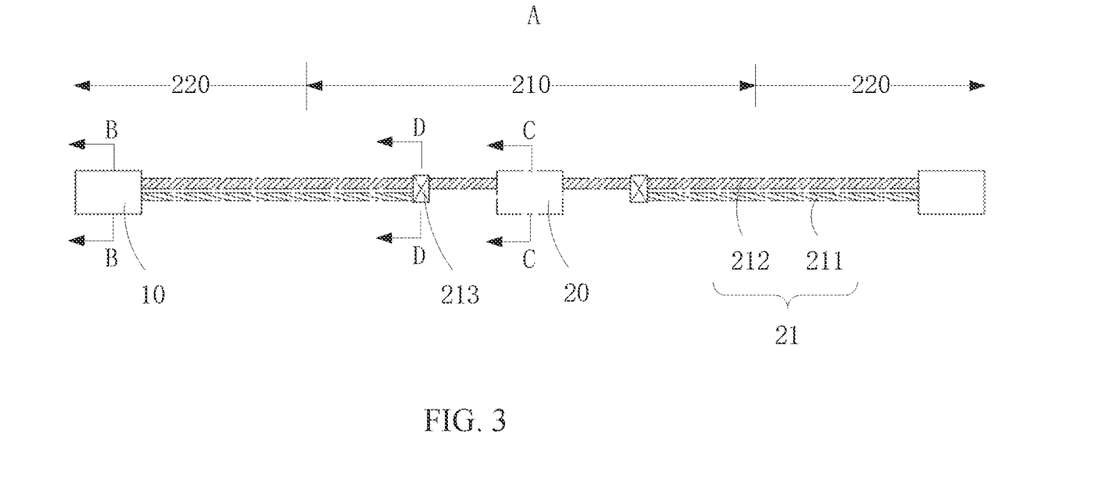
FIG. 3 is a structural schematic diagram illustrating a second type of partially enlarged view at Area A shown in FIG. 1.
Figure 4:
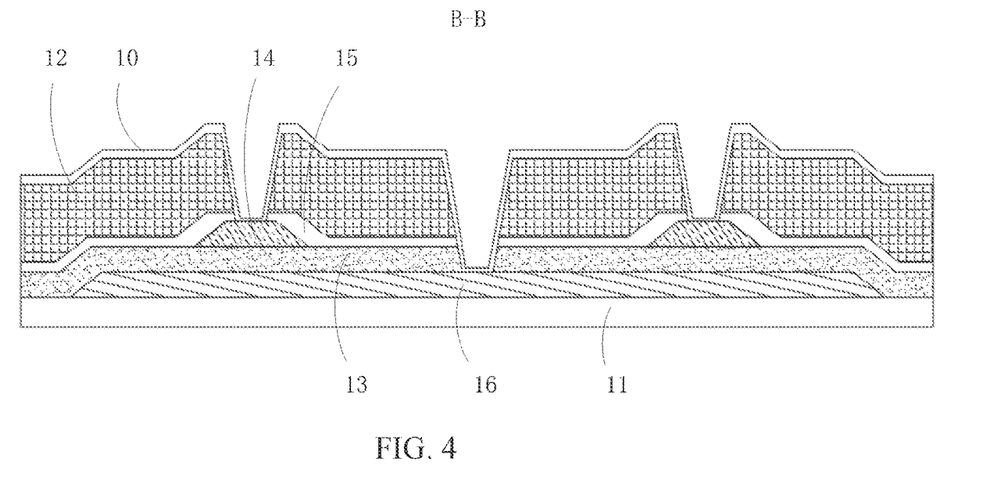
FIG. 4 is a structural schematic diagram illustrating a sectional view along a direction B-B in FIG. 3.

In an embodiment, as shown in FIGS. 2 and 3, a signal connecting line 21 is disposed between the second test terminal 20 and at least one of the first test terminals 10, and the signal connecting line 21 is located between the flattening insulation layer 12 and the base 11. It can be understood that when the second test terminal 20 is disposed between the flattening insulation layer 12 and the base 11, it is easy to apply test signals to the second test terminal 20 in testing the display panel. In the present embodiment, by disposing the signal connecting line 21 between the second test terminal 20 and at least one of the first test terminal 10, it is achieved that the test signals are applied to the second test terminal 20 along the signal connecting line 21 from one of the first test terminals 10. In such a way, it is easy to test the display panel by using the first test terminals 10 and the second test terminal 20. Specifically, the material of the flattening insulation layer 12 can be an organic insulating material. The flattening insulation layer 12 is a polymer film on array (PFA), for example.

In an embodiment, as shown in FIGS. 2 and 3, amongst the first test terminals 10, two of the first test terminals 10 located at two sides of the second test terminal 20 are connected to the second test terminal 20 via the signal connecting line 21, and a distance from the two first test terminals 10 to the second test terminal 20 is less than a distance from other ones of the first test terminals 10 to the second test terminal 20. It can be understood that the second test terminal 20 can be connected to the outside through any of the first test terminals 10. In the present embodiment, amongst the first test terminals 10, two of the first test terminals 10 located at two sides of the second test terminal 20 are connected to the second test terminal 20 via the signal connecting line 21, and the distance from the two first test terminals 10 to the second test terminal 20 is less than the distance from other ones of the first test terminals 10 to the second test terminal 21. That is, two of the first test terminals 10 located closest to the second test terminal 20 are connected via the signal connecting line 21. This prevents the signal connecting line 21 from interfering deployment of other lines in the display panel. It can also decrease the length of the signal connecting line 21, lower the impedance of the signal connecting line 21, and reduce the interference with the test signals.

In an embodiment, as shown in FIGS. 3 to 6, the base 11 is provided with a first signal test line 16 connecting to the first test terminal 10, the base 11 and the first signal test line 16 are provided with a first insulating layer 13 covering the first signal test line 16, the first insulating layer 13 is provided with a second signal test line 14 connecting to the first test terminal 10, the first insulating layer 13 and the second signal test line 14 are provided with a second insulating layer 15 covering the second signal test line 14, the flattening insulation layer 12 is disposed on the second insulating layer 15, a cross-sectional area of the signal connecting line 21 is greater than a cross-sectional area of the first signal test line 16, and a cross-sectional area of the signal connecting line 21 is greater than a cross-sectional area of the second signal test line 14. It can be understood that both the first signal test line 16 and the second signal test line 14 are configured to connect functional structures, such as thin-film transistors in the display panel, to realize the testing of the display panel. Specifically, both the first signal test line 16 and the second signal test line 14 that are connected to the first test terminal 10 via corresponding via holes are of existing structures, which are not repeated herein.

It is worth to be noted that during a test is performed on the display panel, compared to the first test terminal 10 that directly receives the test signals, the second test terminal 20 needs an additional use of the signal connecting line 21 to receive the test signals. Since the signal connecting line 21 may not meet the requirements of resistance and capacitance matching, it is easy to cause a certain degree of difference between the test signals received by the second test terminal 20 and the test signals received by the first test terminal 10. In the present embodiment, by making the cross-sectional area of the signal connecting line 21 greater than the cross-sectional area of the first signal test line 16 and making the cross-sectional area of the signal connecting line 21 greater than the cross-sectional area of the second signal test line 14, increasing the cross-sectional area of the signal connecting line 21 can decrease the resistance of the signal connecting line 21, thereby avoiding a greater difference between the test signals received by the second test terminal 20 and the test signals received by the first test terminal 10.

In an embodiment, as shown in FIGS. 2, 3, 7 and 8, the signal connecting line 21 is disposed between the base 11 and the first insulating layer 13; or the signal connecting line 21 is disposed between the first insulating layer 13 and the second insulating layer 15.

It can be understood that the signal connecting line 21 can be located in the base substrate 1 at any position. Specifically, in the present embodiment, the signal connecting line 21 is disposed between the base 11 and the first insulating layer 13; or the signal connecting line 21 is disposed between the first insulating layer 13 and the second insulating layer 15. That is, the signal connecting line 21 is disposed in a layer as the same as the first signal test line 16 or the second signal test line 14 for ease of using a same process to manufacture the signal connecting line 21 and the first signal test line 16, or the signal connecting line 21 and the second signal test line 14.

Figure 5:
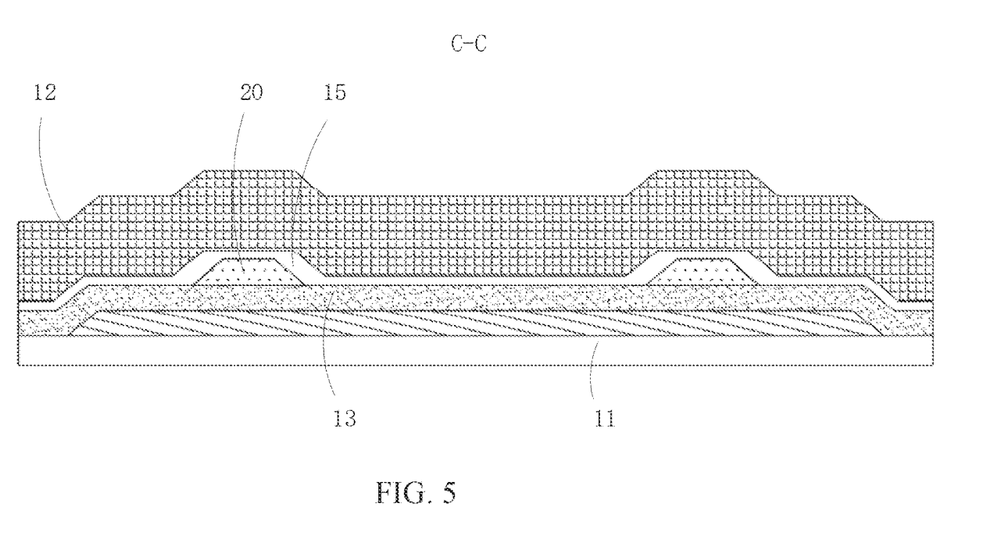
FIG. 5 is a structural schematic diagram illustrating a first type of sectional view along a direction C-C in FIG. 3.
Figure 6:
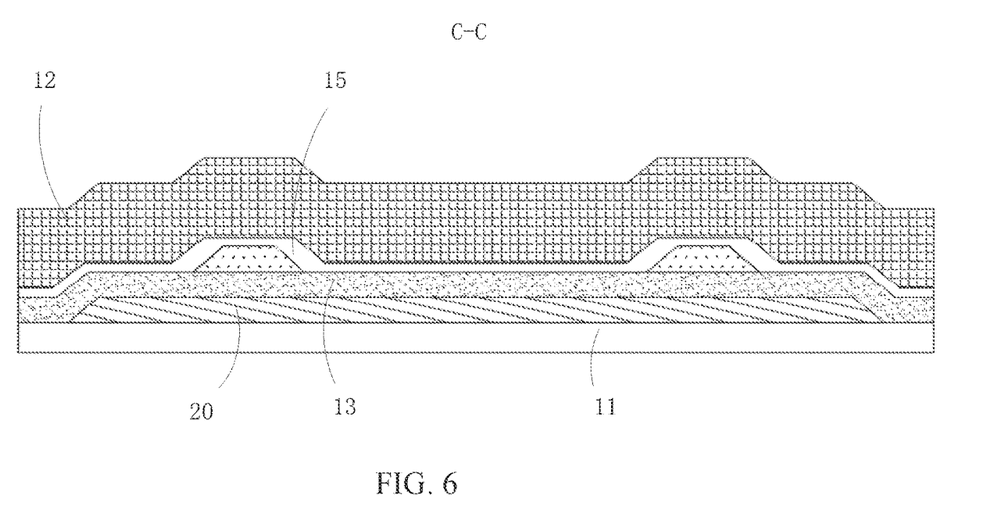
FIG. 6 is a structural schematic diagram illustrating a second type of sectional view along a direction C-C in FIG. 3.

In an embodiment, as shown in FIGS. 5 and 6, the second test terminal 20 is disposed between the base 11 and the first insulating layer 13; or the second test terminal 20 is disposed between the first insulating layer 13 and the second insulating layer 15.

It can be understood that the second test terminal 20 can be located in the base substrate 1 at any position. Specifically, in the present embodiment, as shown in FIG. 6, the second test terminal 20 is disposed between the base 11 and the first insulating layer 13; or as shown in FIG. 5, the second test terminal 20 is disposed between the first insulating layer 13 and the second insulating layer 15. All these solutions can realize the sealing or covering of the second test terminal 20 by the flattening insulation layer 12 or other insulating layers.

Figure 7:
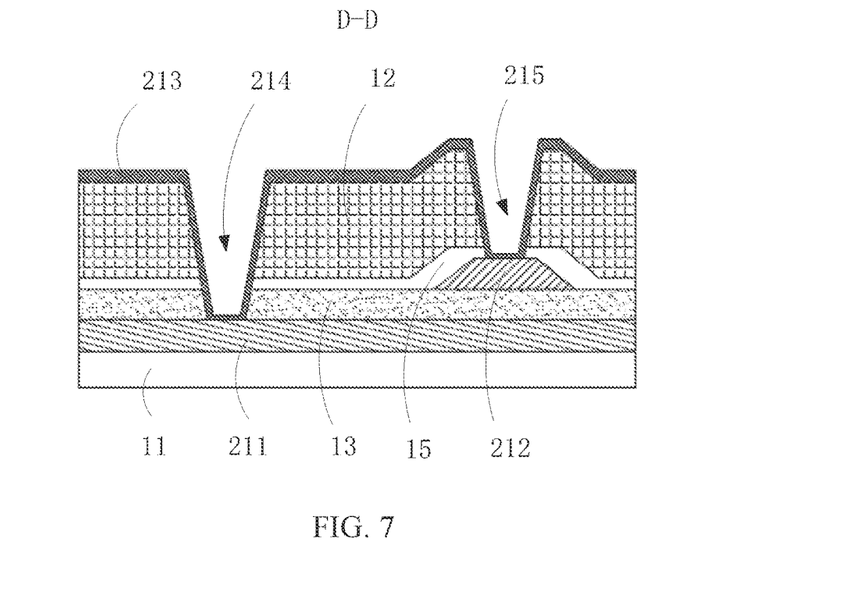
FIG. 7 is a structural schematic diagram illustrating a first type of sectional view along a direction D-D in FIG. 3.
Figure 8:
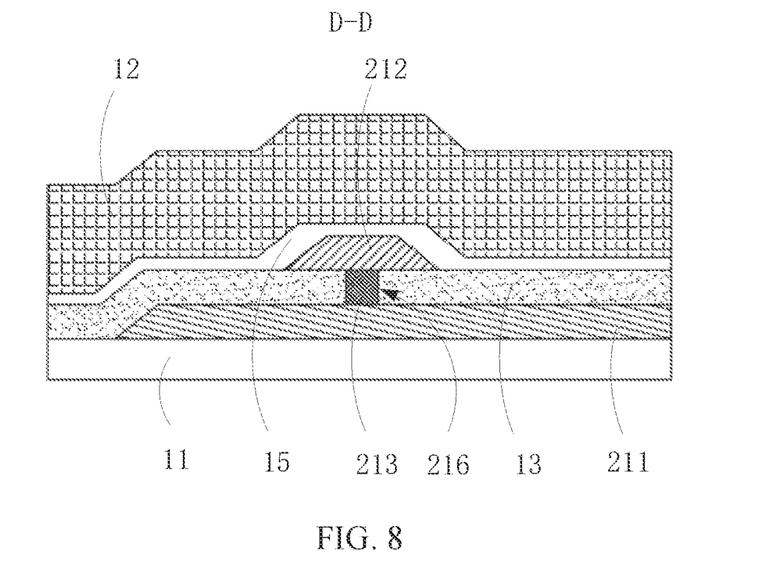
FIG. 8 is a structural schematic diagram illustrating a second type of sectional view along a direction D-D in FIG. 3.

In an embodiment, as shown in FIGS. 3, 7 and 8, the signal connecting line 21 includes a first signal connecting line 211 disposed between the base 11 and the first insulating layer 13 and a second signal connecting line 212 disposed between the first insulating layer 13 and the second insulating layer 15, and the first signal connecting line 211 and the second insulating layer 212 are connected in parallel through a bridging line 213. It can be understood that the signal connecting line 21 may include the first signal connecting line 211 disposed between the base 11 and the first insulating layer 13 and the second signal connecting line 212 disposed between the first insulating layer 13 and the second insulating layer 15. In the present embodiment, by connecting the first signal connecting line 211 and the second signal connecting line 212 in parallel, the impedance of the signal connecting line 21 can be reduced, thereby avoiding a greater difference between the test signals received by the second test terminal 20 and the test signals received by the first test terminal 10.

In the present embodiment, as shown in FIG. 7, a first via hole 214 is disposed above the first signal connecting line 211 and sequentially penetrates the first insulating layer 13, the second insulating layer 15 and the flattening insulation layer 12, a second via hole 215 is disposed above the second signal connecting line 212 and sequentially penetrates the second insulating layer 15 and the flattening insulation layer 12, the bridging line 213 is disposed between the flattening insulation layer 12 and the sealing glue layer, one end of the bridging line 213 is connected to the first signal connecting line 211 through the first via hole 214, and the other end of the bridging line 213 is connected to the second signal connecting line 212 through the second via hole 215. It can be understood that by connecting one end of the bridging line 213 to the first signal connecting line 211 through the first via hole 214 and connecting the other end of the bridging line 213 to the second signal connecting line 212 through the second via hole 215, it is achieved that the first signal connecting line 211 and the second signal connecting line 212 are connected in parallel. It is worth to be noted that all the first via hole 214, the second via hole 215 and the bridging line 213 are located in the sealant-coated sub region 220. Specifically, the bridging line 213 can be manufactured using a material and in a process as the same as the first test terminal 10.

In an embodiment, as shown in FIG. 8, the first insulating layer 13 is provided with a third via hole 216, the bridging line 213 is disposed at the third via hole 216, two ends of the bridging line 213 are connected to the first signal connecting line 211 and the second signal connecting line 212 respectively, and the bridging line 213 is located in the sealant-coated sub regions 220 or the sealant-blanked sub region 210. It can be understood that the third via hole 216 is disposed in the first insulating layer 13, the bridging line 213 is disposed at the third via hole 216 without any exposure, and accordingly the positions of the bridging line 213 and the third via hole 216 can be varied. Specifically, they can be located in the sealant-coated sub region 220 or the sealant-blanked sub region 210.

Above all, in the present application, by dividing the bonding test region 200 into the sealant-blanked sub region 210 and the sealant-coated sub region 220 and deploying in the sealant-coated sub region 220 each of the first test terminals requiring to be sealed by the sealing glue layer, there is no exposed test terminals in the sealant-blanked sub region 210. This avoids the test terminals being exposed in the sealant-blanked sub region 210, thereby preventing static electricity from introducing into the display panel and ensuring stability of electric circuits inside the display panel.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A display panel, comprising a display region and a bonding test region located at a side of the display region, the display panel comprising a base substrate which is provided with a plurality of first test terminals located in the bonding test region;

wherein the bonding test region comprises a sealant-blanked sub region located at a middle part of the bonding test region and sealant-coated sub regions located at two sides of the sealant-blanked sub region, wherein each of the first test terminals is located in the sealant-coated sub region, and the base substrate and each of the first test terminals are provided with a sealing glue layer covering each of the first test terminals.

2. The display panel according to claim 1, further comprising at least a second test terminal located in the sealant-blanked sub region, wherein the base substrate comprises a base and a flattening insulation layer located above the base, each of the first test terminals is located on the flattening insulation layer, and the second test terminal is located between the flattening insulation layer and the base.

3. The display panel according to claim 2, wherein a signal connecting line is disposed between the second test terminal and at least one of the first test terminals, and the signal connecting line is located between the flattening insulation layer and the base.

4. The display panel according to claim 3, wherein amongst the first test terminals, two of the first test terminals located at two sides of the second test terminal are connected to the second test terminal via the signal connecting line, and a distance from the two first test terminals to the second test terminal is less than a distance from other ones of the first test terminals to the second test terminal.

5. The display panel according to claim 3, wherein the base is provided with a first signal test line connecting to the first test terminal, the base and the first signal test line are provided with a first insulating layer covering the first signal test line, the first insulating layer is provided with a second signal test line connecting to the first test terminal, the first insulating layer and the second signal test line are provided with a second insulating layer covering the second signal test line, the flattening insulation layer is disposed on the second insulating layer, a cross-sectional area of the signal connecting line is greater than a cross-sectional area of the first signal test line, and a cross-sectional area of the signal connecting line is greater than a cross-sectional area of the second signal test line.

6. The display panel according to claim 5, wherein the signal connecting line is disposed between the base and the first insulating layer.

7. The display panel according to claim 5, wherein the signal connecting line is disposed between the first insulating layer and the second insulating layer.

8. The display panel according to claim 5, wherein the second test terminal is disposed between the base and the first insulating layer.

9. The display panel according to claim 5, wherein the second test terminal is disposed between the first insulating layer and the second insulating layer.

10. The display panel according to claim 5, wherein the signal connecting line comprises a first signal connecting line disposed between the base and the first insulating layer and a second signal connecting line disposed between the first insulating layer and the second insulating layer, and the first signal connecting line and the second insulating layer are connected in parallel through a bridging line.

11. The display panel according to claim 10, wherein a first via hole is disposed above the first signal connecting line and sequentially penetrates the first insulating layer, the second insulating layer and the flattening insulation layer, a second via hole is disposed above the second signal connecting line and sequentially penetrates the second insulating layer and the flattening insulation layer, the bridging line is disposed between the flattening insulation layer and the sealing glue layer, one end of the bridging line is connected to the first signal connecting line through the first via hole, and the other end of the bridging line is connected to the second signal connecting line through the second via hole.

12. The display panel according to claim 10, wherein the first insulating layer is provided with a third via hole, the bridging line is disposed at the third via hole, two ends of the bridging line are connected to the first signal connecting line and the second signal connecting line respectively, and the bridging line is located in the sealant-coated sub regions or the sealant-blanked sub region.

13. A display panel, comprising a display region and a bonding test region located at a side of the display region, the display panel comprising a base substrate which is provided with a plurality of first test terminals located in the bonding test region;
wherein the bonding test region comprises a sealant-blanked sub region located at a middle part of the bonding test region and sealant-coated sub regions located at two sides of the sealant-blanked sub region, wherein each of the first test terminals is located in the sealant-coated sub region, and the base substrate and each of the first test terminals are provided with a sealing glue layer covering each of the first test terminals;
wherein the display panel further comprises at least a second test terminal located in the sealant-blanked sub region, wherein the base substrate comprises a base and a flattening insulation layer located above the base, each of the first test terminals is located on the flattening insulation layer, and the second test terminal is located between the flattening insulation layer and the base;
wherein a signal connecting line is disposed between the second test terminal and at least one of the first test terminals, and the signal connecting line located between the flattening insulation layer and the base;
wherein amongst the first test terminals, two of the first test terminals located at two sides of the second test terminal are connected to the second test terminal via the signal connecting line, and a distance from the two first test terminals to the second test terminal is less than a distance from other ones of the first test terminals to the second test terminal; and
wherein the base is provided with a first signal test line connecting to the first test terminal, the base and the first signal test line are provided with a first insulating layer covering the first signal test line, the first insulating layer is provided with a second signal test line connecting to the first test terminal, the first insulating layer and the second signal test line are provided with a second insulating layer covering the second signal test line, the flattening insulation layer is disposed on the second insulating layer, a cross-sectional area of the signal connecting line is greater than a cross-sectional area of the first signal test line, and a cross-sectional area of the signal connecting line is greater than a cross-sectional area of the second signal test line.

14. The display panel according to claim 13, wherein the signal connecting line is disposed between the base and the first insulating layer.

15. The display panel according to claim 13, wherein the signal connecting line is disposed between the first insulating layer and the second insulating layer.

16. The display panel according to claim 13, wherein the second test terminal is disposed between the base and the first insulating layer.

17. The display panel according to claim 13, wherein the second test terminal is disposed between the first insulating layer and the second insulating layer.

18. The display panel according to claim 13, wherein the signal connecting line comprises a first signal connecting line disposed between the base and the first insulating layer and a second signal connecting line disposed between the first insulating layer and the second insulating layer, and the first signal connecting line and the second insulating layer are connected in parallel through a bridging line.

19. The display panel according to claim 18, wherein a first via hole is disposed above the first signal connecting line and sequentially penetrates the first insulating layer, the second insulating layer and the flattening insulation layer, a second via hole is disposed above the second signal connecting line and sequentially penetrates the second insulating layer and the flattening insulation layer, the bridging line is disposed between the flattening insulation layer and the sealing glue layer, one end of the bridging line is connected to the first signal connecting line through the first via hole, and the other end of the bridging line is connected to the second signal connecting line through the second via hole.

20. The display panel according to claim 18, wherein the first insulating layer is provided with a third via hole, the bridging line is disposed at the third via hole, two ends of the bridging line are connected to the first signal connecting line and the second signal connecting line respectively, and the bridging line is located in the sealant-coated sub regions or the sealant-blanked sub region.

\* \* \* \* \*